United States Patent [19]

Nakamura et al.

[11] Patent Number: 4,693,081
[45] Date of Patent: Sep. 15, 1987

[54] CONTROL SYSTEM AND METHOD FOR CONTROLLING OUTPUT TYPE HYDRAULIC FLUID PUMP OF AUTOMATIC TRANSMISSION PROVIDING INCREASED PUMP OUTPUT PRESSURE WITH INCREASE IN ENGINE LOAD

[75] Inventors: Shinya Nakamura; Seitoku Kubo; Yutaka Taga, all of Toyota, Japan

[73] Assignee: Toyota Jidosha Kabushiki Kaisha, Toyota, Japan

[21] Appl. No.: 785,404

[22] Filed: Oct. 8, 1985

[30] Foreign Application Priority Data

Oct. 8, 1984 [JP] Japan ................................. 59-210779

[51] Int. Cl.⁴ .............................................. F16D 31/02
[52] U.S. Cl. ........................................ 60/448; 60/445; 60/358; 417/220
[58] Field of Search .......................... 60/448, 445, 358; 417/218, 220; 74/867, 868, 866, 869

[56] References Cited

U.S. PATENT DOCUMENTS

| 2,862,363 | 12/1958 | Black et al. | 60/358 |
| 3,206,930 | 9/1965 | Rasmussen et al. | 60/448 |
| 3,739,578 | 6/1973 | Roeske | 60/448 |
| 3,983,700 | 10/1976 | Barrett | 60/448 |
| 4,103,489 | 8/1978 | Fletcher et al. | 60/448 |
| 4,351,152 | 9/1982 | Reynolds et al. | 60/448 |
| 4,445,329 | 5/1984 | Drisko | 60/448 |
| 4,474,104 | 10/1984 | Creffield | 60/448 |
| 4,535,652 | 8/1985 | Nishikawa et al. | 74/866 |

Primary Examiner—James C. Yeung
Attorney, Agent, or Firm—Oblon, Fisher, Spivak, McClelland & Maier

[57] ABSTRACT

An automatic transmission, for a vehicle with an engine, includes a hydraulic fluid pump which supplies pressurized hydraulic fluid. The engine load is detected, and the pump output is controlled so as to increase with increase of the load on the engine. If the pump is one whose output per one revolution of its input member is variable, then its output may be thus controlled by increasing its output per one revolution along with increase in engine load. And, if the pump is a variable capacity type vane type hydraulic fluid pump the output of which per one revolution of its input member is controlled by varying the eccentric position of a controlling member thereof, then its output per one revolution may be thus controlled by detecting the eccentric position of the controlling member using a sensor, and by varying this eccentric position in a feedback manner to achieve a target eccentric position which is determined to give a pump output per one revolution varying as an increasing function of engine load. Alternatively, if the pump is a fixed capacity type electrically driven type hydraulic fluid pump the output of which per one revolution of its input member is substantially constant, then its output may be thus controlled by varying the rotation speed of its input member as an increasing function of engine load. A system for implementing this method is also disclosed.

24 Claims, 10 Drawing Figures

FIG. 2

FIG. 4
(PART 1)

FIG. 4
(PART 2)

CONTROL SYSTEM AND METHOD FOR CONTROLLING OUTPUT TYPE HYDRAULIC FLUID PUMP OF AUTOMATIC TRANSMISSION PROVIDING INCREASED PUMP OUTPUT PRESSURE WITH INCREASE IN ENGINE LOAD

BACKGROUND OF THE INVENTION

The present invention relates to a control system and method for a hydraulic fluid pump whose output is controllable and which is incorporated in an automatic transmission; and more particularly relates to such a control system and method for such a pump which provide good and appropriate hydraulic fluid pressure for the various operating elements of said transmission in a wide range of engine operational conditions.

A typical automatic transmission for a vehicle comprises a gear transmission mechanism which can selectively provide any one of a plurality of forward speed stages (gearing ratios) between its power input shaft connected to the crankshaft of the vehicle engine via a torque converter and its power output shaft connected to the driven road wheels of the vehicle, so as to transmit rotational power therebetween. And such a gear transmission mechanism, which typically comprises a plurality of selectively engagable gear trains, is set in a determinate way to one or the other of said plurality of forward speed stages according to the current values of various operational parameters of the internal combustion engine and of the vehicle incorporating it, by engagement and disengagement in appropriate combinations of various friction engaging devices (hydraulic clutches and hydraulic brakes) incorporated in said transmission, under the control of a control system. In other words, this control system, on an ongoing basis according to the particular current values of said operational parameters, supplies actuating hydraulic fluid pressures to those appropriate ones of said friction engaging devices which are currently required to be engaged, while not supplying such actuating hydraulic fluid pressure to those appropriate ones of said friction engaging devices which are currently required not to be engaged. And the manner in which said plurality of forward speed stages is thus selected between according to the current values of said vehicle operational parameters is conventionally described by one ormroe shift diagrams.

Now, a torque converter for such an automatic transmission is typically filled with hydraulic fluid which circulates in the general circulation pattern of a smoke ring around a toroidal shape defined by a pump impeller, a turbine member, and a stator member, and accordingly a supply of pressurized hydraulic fluid is constantly required for said torque converter. Similarly, for being supplied as actuating hydraulic fluid pressures to those appropriate ones of said friction engaging devices which are currently reuired to be engaged, such a supply of pressurized hydraulic fluid is again required, typically a supply of so called line hydraulic fluid pressure which is selectively switched by one or more speed switching valves to be supplied to the friction engaging devices. This supply is typically provided by a hydraulic fluid pump; and, since this pressurized hydraulic fluid supply is required whether the vehicle is moving or not, and in all of the speed stages of the automatic transmission, it is usual to drive such a hydraulic fluid pump from the power input shaft of the automatic transmission as a whole, i.e. typically from the pump impeller member of the torque converter, which rotates along with the rotation of the crankshaft of the vehicle engine.

In the case of the simple type of hydraulic fluid pump which has no particular regulation means, its output, considered either in terms of fluid volume or pressure, increases along with increase in the rotational speed of the crankshaft of the engine. Since typically the maximum value of the pressure generated by the hydraulic fluid pump is regulated by means of a primary line pressure regulator valve of the spill type, this means that above a certain engine rotational speed the amount of hydraulic fluid vented by this line pressure regulator valve increases, which wastes engine power, accordingly resulting in vehicle operational inefficiency and lowered fuel economy.

In order to cope with this problem, various variable capacity type hydraulic fluid pumps have been proposed. See, for example: SAE Technical Paper Serial No. 790725 (Society of Automotive Engineers, June 1979); Jidoosha Kogaku Zensho (Automotive Engineering Papers) "Power Transmission Device", 15 Nov. 1980, Sankaido (pub.) pp. 273-238; and Nissan Technical Report No. 19 (December 1983), pp. 70-76; none of which it is intended hereby to admit as prior art to the present patent application except to the extent otherwise required by law.

In these proposals, there is proposed a variable capacity pump, the capacity of which is reduced either in response to increase of said pump output or in response to increased crankshaft rotational speed. Accordingly, the output of the pump is strived to be kept constant, and this means that wasted extra pump output is minimized, and accordingly power loss is avoided or reduced.

SUMMARY OF THE INVENTION

However, in fact, the present inventors have realized that it is not actually desirable to have a constant hydraulic fluid pump output irrespective of engine operational conditions. In particular, even if the engine rotational speed remains constant, the output of the hydraulic fluid pump should be increased in response to increase of engine power or load, in order to increase the line pressure and its reliability at this time, and in order to improve lubrication (since typically the hydraulic fluid is relied upon for lubrication of the automatic transmission). Similarly, if the load on the engine remains constant, the output of the hydraulic fluid pump should be increased in response to increase of engine rotational speed, in order to increase the line pressure and its reliability at this time. Also, when the gear transmission mechanism of the automatic transmission is in the act of shifting from one speed stage to antoher, the line pressure is required to perform the actual work of the shifting, i.e. the work of engaging those of the friction engaging devices which are being engaged at this time from their disengaged conditions, and accordingly in this case the output of the hydraulic fluid pump again should be increased. However, in the proposals detailed above, the output of the pump is not increased in response to increased engine load or for shifting of the gear transmission mechanism; and, accordingly, either the output of the pump is in principle too great most of the time, which is wasteful as detailed above, or there is a danger of lack of proper hydraulic fluid pressure at some critical time, such as during shifting of the transmission or during high engine load or high engine load high engine revolution speed operational conditions.

Accordingly, it is the primary object of the present invention to provide a control method for a hydraulic fluid pump of a variable output type included in an automatic transmission, which can solve the problems detailed above.

It is a further object of the present invention to provide such a control method for such a pump, which can satisfactorily perform output control of said hydraulic fluid pump.

It is a further object of the present invention to provide such a control method for such a pump, which ensures that the transmission is never short of hydraulic fluid pressure during shifting between speed stages.

It is a further object of the present invention to provide such a control method for such a pump, which ensures that the transmission is never short of hydraulic fluid pressure during vehicle high engine load operation.

It is a further object of the present invention to provide such a control method for such a pump, which ensures that the transmission is never short of hydraulic fluid pressure during vehicle high engine revolution speed operation.

It is a further object of the present invention to provide such a control method for such a pump, which provides high reliability for the hydraulic fluid pressure.

It is a further object of the present invention to provide such a control method, which maintains vehicle operational efficiency.

It is a further object of the present invention to provide such a control method, which does not waste engine output power.

It is a further object of the present invention to provide such a control method, which ensures that the elements of the transmission are definitely well supplied with good lubrication at all times.

It is further object of the present invention to provide such a control method, which aids with maintaining good vehicle fuel economy.

It is a further object of the present invention to provide a system for control of such a variable output type hydraulic fluid pump included in such an automatic transmission, which aids in the achievement of the above identified method objects.

According to the present invention, these and other objects are accomplished by a control method and system for a hydraulic fluid pump comprised in and supplying pressurized hydraulic fluid for a hydraulically actuated automatic transmission system for a vehicle driven by an engine, the transmission system having hydraulic means for establishing a speed ratio thereof, the hydraulic fluid pump providing hydraulic fluid thereto at a line pressure, comprising the steps of: detecting the load on said engine; and: controlling the output of said hydraulic fluid pump to increase with increase of said detected value of the load on said engine; and by a control system for a hydraulic fluid pump comprised in and supplying pressurized hydraulic fluid for a hydraulically actuated automatic transmission system for a vehicle driven by an engine, comprising: a means for detecting the load on said engine; and: a means for controlling the output of said hydraulic fluid pump to increase with increase of said detected value of the load on said engine.

According to such a structure and such a method, satisfactory control of said hydraulic fluid pump can be exerted. It is ensured that the transmission is never short of hydraulic fluid pressure during vehicle high engine load operation. Since high pump pressure is only provided when required, accordingly vehicle operational efficiency is maintained and engine output power is not wasted. Thereby, good fuel economy is maintained. Further, this control system and method ensure that the elements of the transmission are definitely well supplied with good lubrication at all times.

Further as a particular specialization of the present invention, the rotational speed of said engine may be detected, and the output of said hydraulic fluid pump may be controlled to increase with increase of said detected value of the load on said engine and also to increase with increase of said detected value of the rotational speed of said engine. This ensures that the transmission is never short of hydraulic fluid pressure during vehicle high engine revolution speed operation.

Yet further, as another particular specialization of the present invention, it may be determined whether said transmission is currently changing from one speed stage thereof to another, and the output of said hydraulic fluid pump may be controlled to increase with increase of said detected value of the load on said engine and also to be relatively increased when said transmission is currently changing from one speed stage thereof to another. This ensures that the transmission is never short of hydraulic fluid pressure during shifting between speed stages, and allows the supply of hydraulic fluid by the pump at other times to be set at an absolute minimum.

The pump may be one whose output per one revolution of its input member is variable, and then said output of said hydraulic fluid pump is preferably thus controlled by increasing said output of said pump per one revolution of its input member along with increase in engine load; and, further, said hydraulic fluid pump may be a variable capacity type vane type hydraulic fluid pump the output of which per one revolution of its input member is controlled by varying the eccentric position of a controlling member thereof; and then in this case, as a further specialization of the present invention, said output of sid hydraulic fluid pump per one revolution of its input member may b thus controlled by detecting said eccentric position of said controlling member thereof using a sensor, and by varying said eccentric position of said controlling member in a feedback manner to achieve a target eccentric position thereof which is determined to give an output of said pump per one revolution of its input member varying as an increasing function of engine load. On the other hand, if said hydraulic fluid pump is a fixed capacity type electrically driven type hydraulic fluid pump the output of which per one revolution of its input member is substantially constant, then said output of said hydraulic fluid pump may be thus controlled by varying the rotation speed of its said input member as an increasing function of engine load.

BRIEF DESCRIPTION OF THE DRAWINGS

The present invention will now be described with respect to several preferred embodiments of the apparatus and the methods aspects thereof, and with reference to the illustrative drawings appended hereto. It should be clearly understood, however, that the description of the embodiments, and the drawings, are provided for the purposes of explanation and exemplification only, and are not intended to be limitative of the scope of the present invention in any way, since this scope is to be delimited solely by the accompanying claims. In the figures, spatial terms are to be understood as referring only to the orientation on the drawing paper of the illustrations of the relevant parts, unless otherwise specified; like reference numerals, unless otherwise so specified, denote the same parts and gaps and spaces and so on in the collection of figures relating to one embodiment, and denote like parts and gaps and spaces and so on in figures relating to different embodiments; and:

DESCRIPTION OF THE PREFERRED EMBODIMENTS

Figure 1:
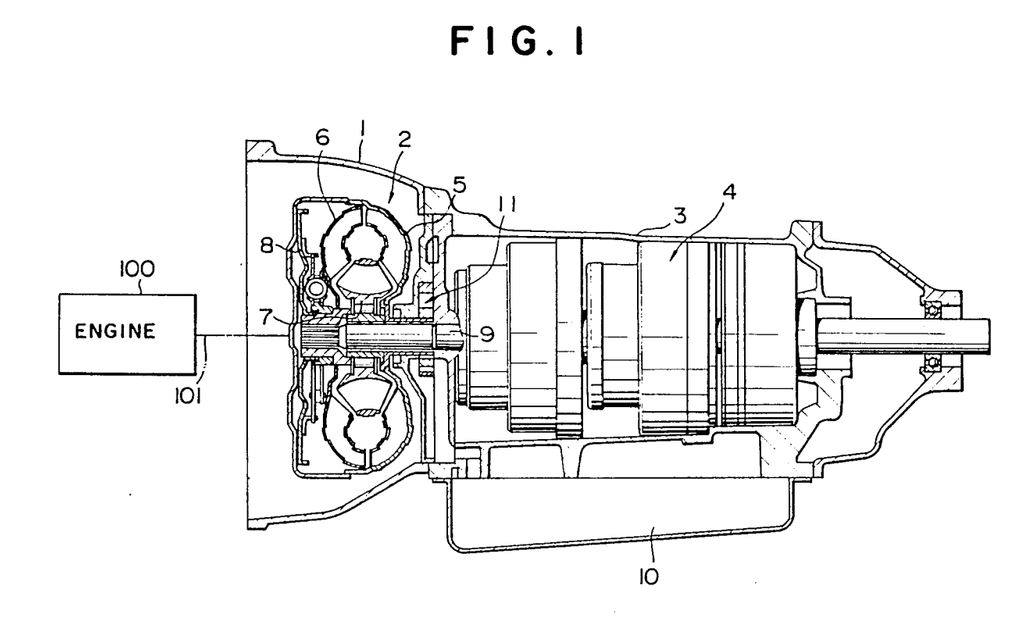
FIG. 1 is a schematic longitudinal sectional view showing the overall layout of the principal components of an automatic transmission, including a variable output type hydraulic fluid pump, to which both of the preferred embodiments of the present invention can be applied.

The present invention will now be described with reference to the preferred embodiments thereof, and with reference to the drawings. FIG. 1 is a schematic longitudinal sectional view showing the overall layout of the components of an automatic transmission, which is housed in a casing denoted by the reference numeral 1; and this figure is applicable to both of the preferred embodiments of the present invention which will be described. In this figure, the automatic transmission is shown as being powered by an internal combustion engine 100 via a shaft 101 (the engine crankshaft, typically) which rotates at a rotational speed which will henceforward be denoted by Ne, and as transmitting output rotational power to a power output shaft which leads, although this is not particularly indicated in the figures, to a differential device for powering the driven wheels of the automotive vehicle towhich this automatic transmission and this internal combustion engine 100 are fitted.

In detail, the automatic transmission comprises a fluid torque converter assembly 2 and a gear transmission mechanism 4 housed in a gear transmission mechanism casing 3. The fluid torque converter assembly 2 is supplied with rotational power via the aforementioned power output shaft 101 of the internal combustion engine 100, which thus functions as a power input shaft for said fluid torque converter assembly 2; and a shaft 9 functions as a power output shaft for said fluid torque converter assembly 2 and also as a power input shaft for the gear transmission mechanism 4 (i.e., the means for establishing a speed ratio) and transmits rotational power therebetween.

The fluid torque converter assembly 2 is of a per se conventional three element single stage type with a lock up clutch, and comprises a pump impeller 5 rotationally connected to the power output shaft 101 of the internal combustion engine 100, a turbine member 6 rotationally connected to the power output shaft 9 for said torque converter assembly 2, and a stator member 7 mounted via a one way clutch to the casing of said fluid torque converter assembly 2. In a per se known fashion, by circulation of transmission fluid in the general circulation pattern of a smoke ring around the toroidal shape defined by the pump impeller 5, the turbine member 6, and the stator member 7, torque is transmitted from the pump impeller 5 to the turbine member 6 and thereby from the power input shaft 101 of the fluid torque converter assembly 2 to the power output shaft 9 thereof, with a certain amount of slippage and also of torque amplification being provided therebetween, the amount of such slippage and torque amplification being determined by the rotational speed of the power input shaft 101 of the torque converter assembly 2 and also by the output load on its power output shaft 9. The amount of this slippage can be ascertained by comparison of the input and output rotational speeds of the torque converter 2. A lock up clutch 8 of a per se known sort is provided for, when optionally engaged by the supply of actuating hydraulic pressure thereto, directly connecting the power input shaft 101 of the torque converter assembly 2 to the power output shaft 9 thereof, thus bypassing the above described hydraulic connection for the torque converter assembly 2 and eliminating said slippage and torque amplification provided thereby. And a hydraulic fluid pressure pump 11, which will be described in detail hereinafter,is arranged between the torue convertr assembly 2 and the gear transmission mechanism 4, andis rotationally driven by the pump impeller 5 of said torque converter assembly 2,i.e. is driven at the rotational speed Ne of the crankshaft 101 of the engine 100.

The gear transmission mechanism 4 will not be particularly shown or explained in detail with regard to its structure, since it may be per se conventional. In outline, this gear transmission mechanism 4 comprises a plurality of planetary gear mechanisms which are per se conventional and a plurality of friction engaging mechanisms, i.e. clutches and brakes, of per se conventional types which are engaged when hydraulic fluid pressure is supplied to their actuating pressure chambers, while they are disengaged when no hydraulic fluid pressure is supplied to their said actuating pressure chambers. Thus, by selective engagement and disengagement of these hydraulic clutches and brakes, the gear treansmission mechanism 4 can be controlled to provide any one of a plurality of forward gearing ratios or rotational speed stages (as well as, typically, at least one reverse gearing ratio orrotational speed stage) between its power input shaft 9 and its power output shaft, in a manner which is per se known to one of ordinary skill in the relevant art based upon the above explanations.

Figure 2:
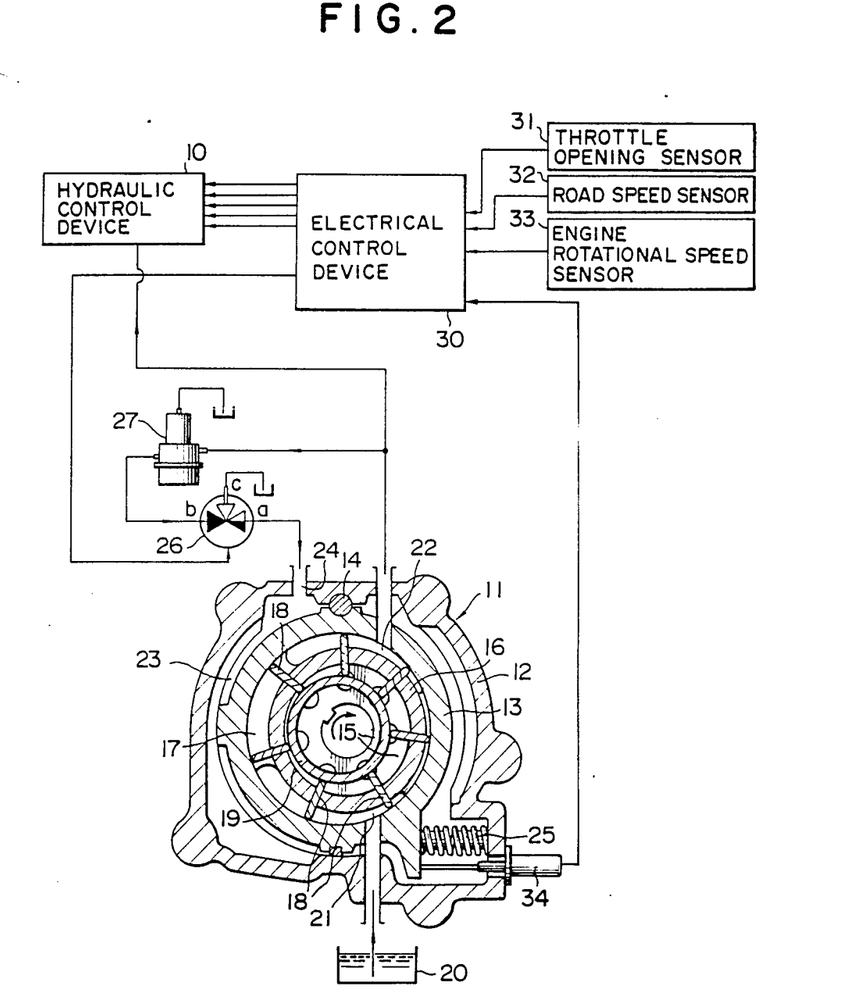
FIG. 2 is a combination drawing, showing a schematic block diagram including, as blocks, relevant parts of the first preferred embodiment of the control system of the present invention, and also showing a transverse cross sectional view of a mechanical type of hydraulic fluid pump which is controlled by said first preferred embodiment.

In general, each of the various hydraulic clutches and brakes referred to above, as well as the lock up clutch 8 incorporated in the torque converter assembly 2, is selectively engaged and disengaged by its hydraulic actuator system, by selective supply of hydraulic fluid pressure thereto from a control system which will now be described, according to the current values of various operational parameters of the vehicle to which this automatic transmission is fitted, such as vehicle road speed, engine load, range set by the vehicle driver on a manual range setting valve, and so on. This control system is of the hybrid hydraulic/electronic type incorporating a microprocessor, and in FIG. 2 a schematic block diagram of relevant parts of said control system, which includeds as a sub system the first preferred embodiment of the control system of the present invention, is shown; also, this FIG. 2 shows a transverse cross sectional view of the hydraulic fluid pump 11 controlled by this first preferred embodiment, which is a mechanical type of hydraulic fluid pump whose output can be hydraulically regulated.

First to describe with regard to its function this hydraulic fluid pump 11, which as explained above is rotationally driven by the engine 100 at crankshaft speed Ne via the pump impeller 5 of the torque converter 2, said pump 11 picks up hydraulic fluid from a sump 20 and supplies it under pressure to a line pressure regulation valve, not particularly shown. The line pressure regulation valve selectively bleeds off some of said pressurized hydraulic fluid back to the sump 20 so as to produce a line pressure. This line pressure is then supplied to the fluid torque converter assembly 2, and also to various elements of the transmission including a manual range setting valve, a lock up clutch control valve, and various speed switching valves which are controlled by solenoid valves. The line pressure regulation valve and these varius switching valves and solenoid valves ae together considered herein as incorporated in an electrically controlled hydraulic fluid pressure control device 10, which as shown in FIG. 1 is located generally under the gear transmission mechanism 4.This hydraulic control device 10 is controlled by an electrical control device 30, which thus controls the engagement and disengagement of the various hydraulic cluthces and brakes discussed above. A microcomputer incorporated in this electrical control device 30 receives input signals from sensors including: a throttle opening sensor 31, which senses the position of the throttle pedal (not particularly shown) of the internal combustion engine 100 of the vehicle and which produces an output signal representative thereof, which is taken as representative of engine load; a road speed sensor 32, which produces an output signal representative of vehicle road speed; an engine rotational speed sensor 33, which senses the rotational speed of the pump impeller 5 of the torque converter assembly 2, i.e., the rotational speed Ne of the crankshaft 101 of the engine 100, and which produces an output signal representative thereof; and a pump output sensor 34, which as will be understood later produces an output signal representative of the output of the hydraulic fluid pump 11 per one revolution of the input member thereof. And the microcomputer repeatedly executes a control program for setting the various clutches and brakes detailed above to be engaged or disengaged, and for controlling the output pressure of the pump 11 as will be explained shortly, by appropriate supply or non supply of ON/OFF electrical control signals to the solenoid valves controlling the speed shifting valves, etc..

Now to describe the hydraulic fluid pump 11 with regard to its structure which is of the vane type, it has a housing 12 in which a slide ring 13 is pivotally supported by a pivot 14, so as to be able to sway to the right or to the left from the point of view of the figure through a relatively small angle. The slide ring 13 is formed with a cylindrical inner cavity, and in this cavity there is rotatably mounted a disk shaped rotor member 15 which is provided with a plurality of axially projecting sector shaped portions 16 with radial slots defined between them. This rotor member 15 is rotationally driven by the engine 100 at crankshaft speed Ne, via the pump impeller of the torque converter as described above, and slidably supports a plurality of vane members 18 in the abovementioned radial slots provided between said sector shaped projections 16. In the space generally defined between the projections 16, resting axially against the disk shape of the rotor member 15 and located in front of it from the point of view of the drawing, there is provided a vane ring 19 which is positioned as coaxial with the aforementioned cylindrical inner cavity of the slide ring 13. Thus, a plurality of pump chambers 17 are defined betweedn the cylindrical inner surface of the slide ring 13 and the cylindrical outer surface of the vane ring 19 with regard to the radial direction, and bertween the vanes 18 with regard to the circumferential direction. With the slide ring 13 and the vane ring 19 in their positions as shown in the figure, the rotor member 15 is eccentrically between said slide ring 13 and said vane ring 19, so that, as said rotor member 15 with its projections 16 rotate together at engine crankshaft speed as explained above and carry the vane members 18 around with them in a direction shown as the clockwise direction in the figure, each of the pump chambers 17 expands and contracts rhythmically. An input port 21 is provided in an appropriate part of the inner side wall surface of the slide ring 13, to communicate to these pump chambers 17 in turn as they pass it in the leftwards direction as seen in the figure while they are increasing in volume, so that said pump chambers 17 suck hydraulic fluid up from the sump 20 through said input port 21, and on the other hand an output port 22 is provided in another appropriate part of said inner side wall surface of the slide ring 13, to communicate to these pump chambers 17 in turn as they pass it in the rightwards direction as seen in the figure while they are decreasing in volume, so that said pump chambers 17 squirt pressurized hydraulic fluid out thrugh said output port 22 to the hydraulic control device 10, as mentioned above. Thus, the hydraulic fluid pump 11 generates a supply of pressurized hydraulic fluid; and the output of said pump 11 per one revolution threof, as will be readily understood based upon the foregoing explanations, depends upon the amount of eccentricity of the slide ring 13 and the vane ring 19 with respect to the rotor member 15, i.e. upon the set angular position around the axis of the pivot 14 of said integrally connected together slide ring 13 and vane ring 19: the greater is the eccentricity ofthe slide ring 13 the greater is the output of the pump 11 per one revolution thereof for a given engine rotational speed, and conversely the less is the eccentricity of the slide ring 13 the less is the output of the pump 11 per one revolution thereof for a given engine rotational speed.

This angular positon of the slide ring 13 is controlled a follows. A compression coil spring 25 biases the slide ring 13 in the clockwise direction around the pivot 14 as seen in the figure, while a drive chamber 23 is definedon one side f the slide ring 13, between it and the casing 12 of the pump 11, pressure in said drive chamber 23 urging said slide ring 13 in the anticlockwise direction around the pivot 14 as seen in the figure. Thus, the greater is the pressure in the drive chamber 23, the more are the slide ring 13 and the vane ring 19 displaced in the anticlockwise direction in the figure about the pivot 14 against the resistance of the compression coil spring 25 which is overcome, and the less does the eccentricity of said slide ring 13 with respect to the rotor member 15 become, so the less does the output of the pump 11 per one revolutoin thereof become, for a given engine rotational speed. A sensor 34 is fitted to the casing 12 of the pump 11, and its actuated member is connected to an appropriate point on the slide ring 13. Thus, as specified previously, the sensor 34 produces an output electrical signal, which it dispatches to the electrical control device 30, indicative of the current value of the eccentricity of the slide ring 13, i.e. indicative of the current value of the output of the pump 11 per one revolution thereof.

Figure 3:
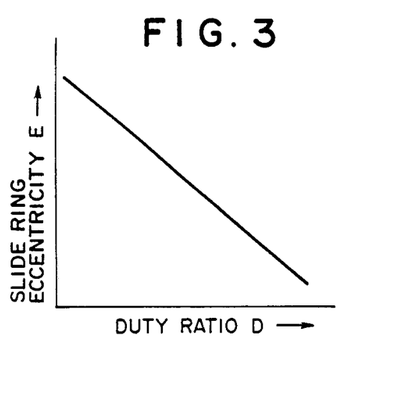
FIG. 3 is a graph showing characteristics of the aforesaid hydraulic fluid pump, in which the duty radio D of an electrical pulse signal is shown along the horizontal axis and the correspondingly controlled eccentricity E of a slide ring of said hydraulic fluid pump is shown along the vertical axis.

And the electrical control device sends a pulse electrical signal to an electromagnetic switching valve 26, for controlling the pressure in the drive chamber 23 in the following way. A port "b" of the electromagnetic switching valve 26 is supplied with a constant supply of hydraulic pressure from the output port 22 of the pump 11, regulated to a substantially constant pressure value by a relief valve 27. Another port "a" of said electromagnetic switching valve 26 is communicated to the drive chamber 23 via a port 24 thereof, while a third port "c" of said valve 26 is communicated to a fluid drain. The electromagnetic switching valve 26 is so structured that: when a solenoid thereof (not particularly shown) is supplied with actuating electrical energy, then its port "a" is communicated to its port "b", while its port "c" is communicated to no other port; while, on the other hand, when said solenoid thereof is not supplied with actuating electrical energy, then its port "a" is communicated to its port "c", while its port "b" is communicated to no other port. Accordingly, the greater becomes the duty ratio D of the pulse signal supplied by the electrical control device 30 to the electromagnetic switching valve 26, the greater does the pressure value supplied to the drive chamber 23 of the pump 11 become, and the less become the eccentricity of the slide ring 13 and the output of the pump 11 per one revolution thereof. In the graph of FIG. 3, the duty ratio D of the controlling electrical pulse signal from the electrical control device 30 is shown along the horizontal axis, and the correspondingly controlled eccentricity E of the slide ring 13 is shown along the vertical axis. And, since the electrical control device 30 is, as mentioned above, supplied with the signal from the sensor 34 which is indicative of the actual value of said eccentricity E of the slide ring 13, thus, by a process of feedback control via altering the duty radio D of the pulse signal to the electromagnetic switching valve 26, said electrical control device 30 can set the eccentricity E of the slide ring 13, and hence the output of the pump 11 per one revolution thereof, to any required value.

It should be particularly noted, as a beneficial feature of the shown construction from the point of view of its fail safe characteristics, that if the electrical control device 30 should fail, then typically the duty ratio of the electrical signal it is dispatching to the electromagnetic switching valve 26 will become substantially zero, and in such a case the port "a" of said switching valve 26 will be permanently communicated to the port "c" thereof, and this will cause the pressure in the drive chamber 23 of the pump 11 to be substantially atmospheric pressure. As will be understood from the above, in these circumstances the eccentricity E of the slide ring 13 will be maximal, and thus the output of the pump 11 per one revolution thereof will be set to its substantially maimal value, thus guarding against any serious consequences to the operational characteristics of the automatic transmission as a whole or to the lubrication therefor. the same thing will happen if the drive chamber 26 should spring a leak. Accordingly, this shown construction has good fail safe characteristics.

Figure 4:
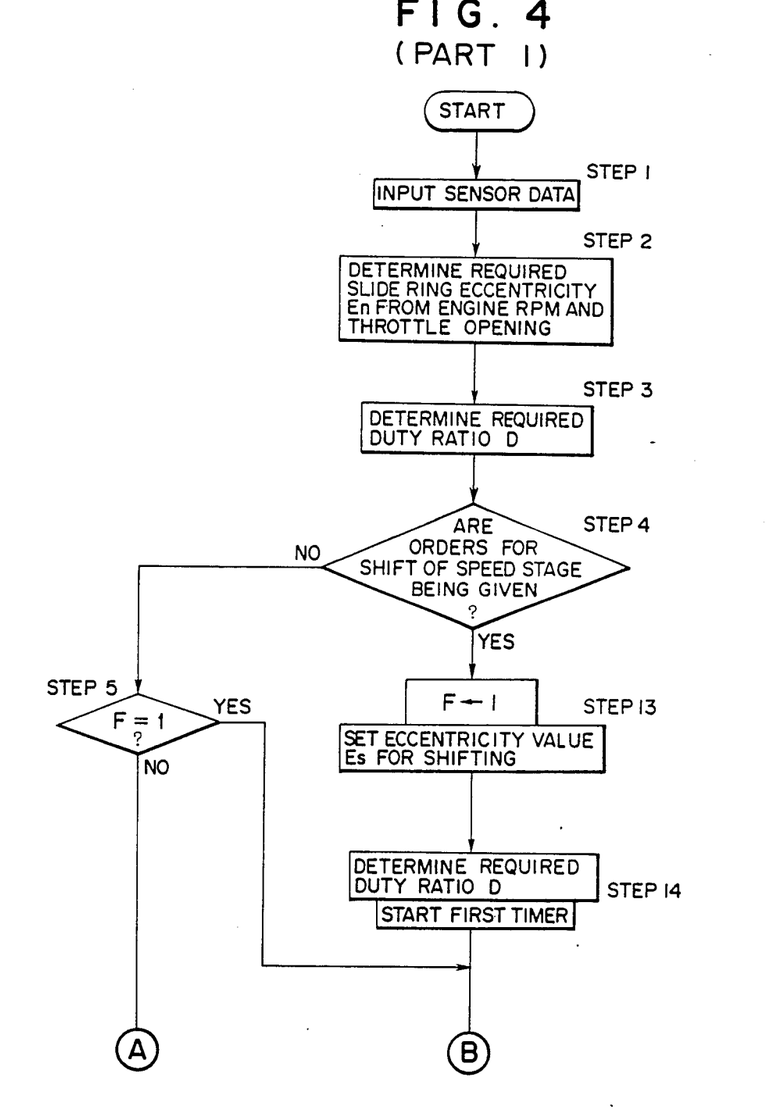
FIG. 4 is a flow chart for a portion of a program executed by a microprocessor incorporated in said first preferred embodiment of the control sysrtem of the present invention, for controlling the output pressure of said mechanical type hydraulic fluid pump of FIG. 2 according to the first preferred embodiment of the method of the present invention.

One relevant portion of the control program obeyed by the microcomputer incorporated in the electrical control device 30 will now be detailed, with reference to FIG. 4 which is a flow chart of said relevant portion. This implements the control method according to the first preferred method embodiment of the present invention, for controlling the output pressure of the hydraulic fluid pressure pump 11. This portion of the program is performed at regular intervals, or once every time the crankshaft of the engine 100 rotates through a determinate angle. this program fragment will now be described.

First, in the step 1, the data from the sensors such as the sensors 31, 32, 33, and 34 is read in. then the flow of control pases to the step 2.

Next, in this step 2, a desired eccentricity En for the slide ring 13 of the pump 11 is decided upon, based upon the current values of engine rotational speed Ne as just inputted from the engine rotational speed sensor 33 and of engine load as determined by the current value of engine throttle opening as just inputted from the throttle opening sensor 31. This desired eccentricity En reduces as the engine rotational speed Ne increases, and increases as the engine throttle opening Th increases. En may be determined from a data map stored in a read only memory (ROM) of the microcomputer and determined in advance according to the redults of experiments on a test engine and transmission, or may be calculated on the spot; in any case, the characteristics of En with respect to the engine rotational speed Ne and the throttle opening Th are as specified above and as exemplarily illustrated in FIG. 5, which is a graph relating to the operation of this first preferred embodiment in which engine crankshaft rotational speed Ne is shown along the horizontal axis and the correspondingly controlled eccentricity E of said slide ring 13 of said hydraulic fluid pump 11 is shown along the vertical axis. Generally, when the rotational speed of the input member of the pump 11 increases, other things being equal, the overall output of the pump 11 increases. Thus, although the output of the pump 11 per one revolution thereof diminishes as engine rotational speed Ne increases, because the input member of the pump 11 is rotating faster at this time, the overall output of the pump 11 in fact at least does not decrease. In this first preferred embodiment of the method of the present invention, as shown in FIG. 6 which is a graph in which engine crankshaft rotational speed Ne is shown along the horizontal axis and pump output Q for different constant values of engine load as represented by throttle opening Th is shown along the vertical axis: at low engine load Th1 the value of the pump output Q, after initially increasing sharply as engine revolution speed Ne increases from zero up to a certain fairly low value, remains essentially constant thereafter; while at higher values Th2, Th3, and Th4 of engine load the pump output Q increases along with increasing engine revolution speed Ne; and further the slope of the graph of engine load Q against engine revolution speed Ne increases with increasing engine load Th. In any case, next the flow of control passes to the step 3.

In this step 3, the required duty factor D for the pulse signal to be supplied to the electromagnetic switching valve 26, to produce this value En for the eccentricity of the position of the slide ring 13, is determined. Again, this is typically performed by consulting a table prepared in advance. Then the flow of control passes to the decision step 4.

Next, in this decision step 4, a decision is made as to whether or not, at this time, the electrical control device 30 is outputting a signal to the various solenoid valves etc. (not shown) of the hydraulic control device 10, to cause shifting of the speed stage of the gear transmission mechanism 4. If the answer to this decision is YES, then next the flow of control passes to the step 13; but otherwise, if the answer to this decision is NO, the flow of control passes to the decision step 5. It should be noted that the speed stage of the gear transmission mechanism 4 only actually is started to be shifted after a lapse of a certain time period designated as Tr, from the start of outputting of orders from the electrical control device 30 to the hydraulic control device 10 for such a speed stage shift.

In the decision step 5, at which point in the FIG. 4 program point it has been determined that orders are not currently being given by the electrical control device 30 for the engaged speed stage of the gear transmission mechanism 4 to be shifted, a test is made of the value of a flag F. If the value of the flag F is 1, then next the flow of control passes next to the decision step 15; while, if the value of the flag F is not 1, then next the flow of control passes to the step 6. This flag F is set to unity, as will be seen shortly, if and only if the speed stage of the gear transmission mechanism 7 is currently actually being shifted.

In this step 6, En is set to be the target value Et for the eccentricity of the slide ring 13; and next the flow of control passes to the step 7.

In this step 7, an electrical pulse signal of duty ratio D is outputted to the electromagnetic switching valve 26, so as to produce an appropriate pressure value in the drive chamber 23 to produce this value for the eccentricity of the position of the slide ring 13. Then the flow of control passes to the step 8.

Next, in this step 8, a value representing the actual thus produced eccentricity Er of the position of the slide ring 13 is inputted to the microcomputer, according to the output electrical signal from the sensor 34 therefor. And then the flow of control passes to the decisin step 9.

Next,in this step 9, a decision is made as to whether or not the actual value Er for the thus produced eccentricity of the position of the slide ring 13 is greater than the target value Et therefor by more than a certain tolerance deltaE. If the answer to this decision is YES, so that the actual eccentricity value Er should be decreased somewhat, then next the flow of control passes to the step 10; and otherwise, if the answer to this decision is NO, the flow of control passes to the decision step 11.

In the step 10, the value of the duty ratio D of the aforesaid electrical pulse signal outputtedtot he electromagnetic switching valve 26 is increased by a certain appropriate value deltaD, and this pulse signal is newly outputted to said electromagnetic switching valve 26. As explained above, this causes the pressure in the drive chamber 23 of the pump 11 to be somewaht increased, which somewhat diminishes the eccentricit of the position of the slide ring 13. Then the flow of control passes back to the step 8, to cycle round again.

On the other hand, if it has been determined in the decision step 9 that the eccentricity E of the position of the slide ring 13 does not need to be decreased, then,in the decision step 11, a decision is made as to whether or not the actual value Er for the currently produced eccentricity of the position of the slide ring 13 is less than the target value Et therefor by more than a certain tolerance deltaE. If the answer to this decision is YES, so that the actual eccentricity value Er should be increased somewhat, then next the flow of control passes to the step 12; and otherwise,if the answer to this decision is NO,in which case it has been ascertained that the actual value Er for the current eccentricity of the position of the slide ring 13 is within an acceptable tolerance equal to the target value Et therefor, the flow of control passes to exit from the FIG. 4 routine, without doing anything further.

In the step 12, the value of the duty ratio D of the aforesaid electrical pulse signal outputted to the electromagnetic switching valve 26 is decreased by the same aforesaid certain appropriate value deltaD, and this pulse signal is newly outputted to said electromagnetic switching valve 26. As explained above, this causes the pressure in the drive chamber 23 of the pump 11 to be somewhat decreased, which somewhat increases the eccentricity of the position of the slide ring 13. Then the flow of control passes back to the step 8, to cycle round again.

Thus, in summary, by the effect of these steps 7 through 12, the actual value Er for the thus produced eccentricity of the position of the slide ring 13 is brought to be substantially equal to the target value Et therefor, within a certain tolerance range, by a feedback process of control of adjustment of the pulse ratio D of the electrical signal supplied to the electromagnetic switching valve 26.

Now, reverting to the YES branch from the decision step 4, to which as specified earlier the flow of control is passed when it is decided that shifting orders are in fact currently being outputted by the electrical control device 30 to the various solenoid valves etc. (not shown) of the hydraulic control device 10 to cause shifting of the speed stage of the gear transmission mechanism 4, this branch leads to the step 13. In this step 13, the value of the flag F is set equal to 1, so as to cause a branching in the decision step 5 on the next iteration through the FIG. 4 routine in the appropriate direction, and next the value Es for the eccentricity of the positin of the slide ring 13 is set to an appropriate value. This value Es is substantially greater than the normal value En set in the step 2 for the eccentricity of said ring 13,so as to cause the pump 11 to produce a significantly increased output at this time of speed stage shifting, for performing the actual work of engagement of those of the hydraulic fluid pressure friction actuated engaging means of the gear transmission mechanism 4 which are to be engaged during this speed stage shift; in fact, the value Es may be determined according to which particular pair of speed stages of the gear transmission mechanism 4 are being shifted between, in other words may be varied according to which shift said gear transmission mechanism 4 is undergoing. Alternatively, the value Es may be a single value which is utilized in the case of all speed stage shifting conditions. In any case, next the flow of control passes to the step 14.

In this step 14, the required duty factor D for the pulse signal to be supplied to the electromagnetic switching valve 26, to produce this enhanced value Es for the eccentricity of the position of the slide ring 13, is determined. Again, this is typically performed by consulting a table prepared in advance. Also, a first timer is started. then the flow of control passes to the decision step 15.

Next, in this decision step 15, to which also the flow of control passes from the YES branch from the decision step 5 as stated above, a decision is made as towhether or not the time interval t1 so far counted by this first timer has yet become greater than or equal to a predetermined time interval Te1, or not. If the answer to this decision is YES, then next the flow of control passes to the decision step 16; and otherwise, if the answer to this decision is NO, the flow of control passes to the step 6, already described.

In the decision step 16, a decision is made as to whether the electrical control device 30 has yet ceased to output its signal or signals to the various solenoid valves etc. (not shown) of the hydraulic control device 10, to cause shifting of the speed stage of the gear transmission mechanism 4, or not. If the answer to this decision is YES, then next the flow of control passes to the step 18; and otherwise, if the answer to this decision is NO, the flow of control passes to the step 17.

In the step 17, to which control passes if it has been detrmined that orders for speed stage shifting have not yet been stopped, the duty ratio D for the pulse electrical signal to be supplied shortly to the electromagnetic switching valve 26 is set to the value Ds, and the target value Et for the eccentricity of the slide ring 13 is set to the value Es. Then the flow of control passes to the step 7, already described.

On the other hand,in the step 18, to which control passes if it has been determined that orders for speed stage shifting have now been stopped, a second timer is started, and next the flow of control passes to the decision step 19.

In this decision step 19, a decision is made as to whether or not the time interval t2 so far counted by this second timer has yet become greater than or equal to a predetermined time interval Te2, or not. If the answer to this decision is YES, then next the flow of control passes to the step 20; and otherwise, if the answer to this decision is NO, the flow of control passes to the step 17, already described.

In this step 20, the value of the flag F is reset to zero, and also the first and second timers are reset. Then the flow of control passes to the step 6, already described.

Figure 5:
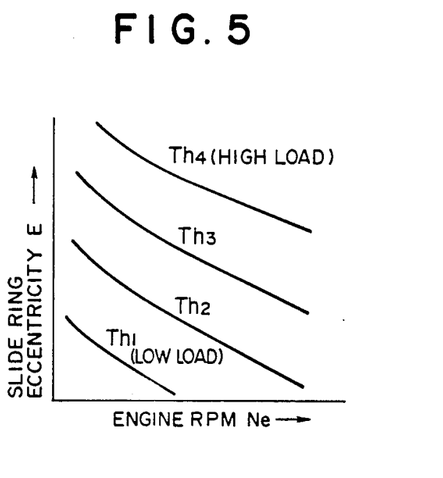
FIG. 5 is a graph relating to the operation of said first preferred embodiment, in which engine crankshaft rotational speed Ne is shown along the horizontal axis and the correspondingly controlled eccentricity E of said slide ring of said hydraulic fluid pump is shown along the vertical axis, showing the eccentricity operational characteristics for different values of engine load as represented by throttle opening Th.
Figure 6:
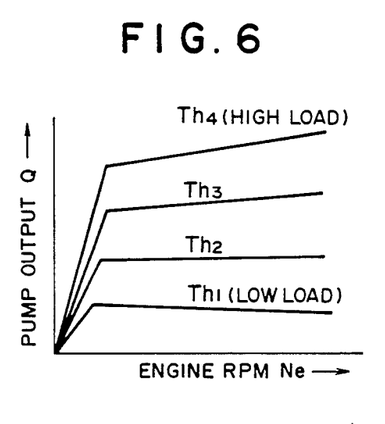
FIG. 6 is a graph, again relating to the operation of said first preferred embodiment, in which engine crankshaft rotational speed Ne is shown along the horizontal axis and pump output Q is shown along the vertical axis, showing the pump output operational characteristics for different values of engine load as represented by throttle opening Th.
Figure 7:
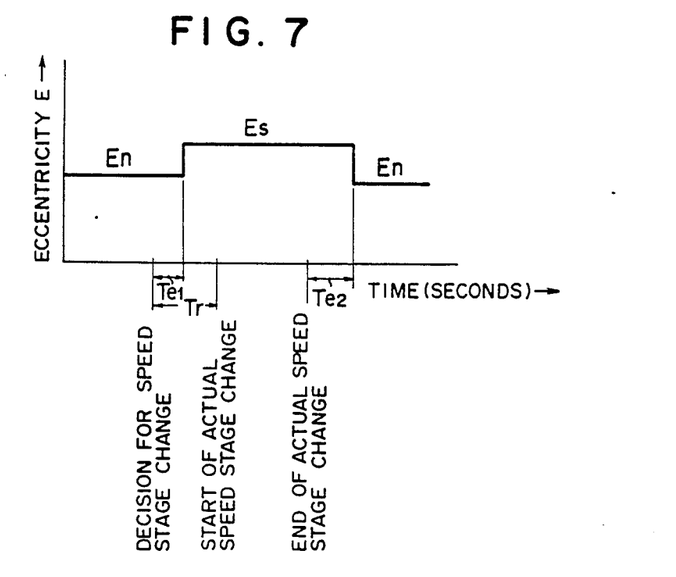
FIG. 7 is a time chart also relating to the operation of said first preferred embodiment, in whichtime is shown along the horizontal axis and the eccentricity E of said slide ring of said hydraulic fluid pump is shown along the vertical axis, showing how said eccentricity E is increased during a speed stage shift of the gear transmission mechanism of the automatic transmission.

According to the control method explained above, during operation of the transmission in one speed stage, i.e. without shifting of speed stage, the eccentricity E of the slide ring 13 is controlled, as a function of engine load Th and engine rotational speed Ne, as shown by the FIG. 5 graph. And thereby, correspondingly, during this non shifting transmission operation, the output Q of the pump 11 is controlled, as a function of engine load Th and engine rotational speed Ne, as shown by the FIG. 6 graph. Thus, at low engine load, the output Q of the pump 11 is substantially constant over a wide range of engine rotational speed; but, at medium and high values of engine load, the output Q of the pump 11 increases with increasing engine rotational speed. And, the greater is the value of engine load, the more does said output Q of the pump 11 increase in relation to increase in engine load. Further, for a given engine rotational speed, the output Q of the pump 11 increases with increase of engine load. And, yet further, if on the other hand the gear transmission mechanism 4 is being shifted from one of its speed stages to another one thereof, then as shown in the time chart of FIG. 7, in which time is shown along the horizontal axis and the eccentricity E of the slide ring 13 of the pump 11 is shown along the vertical axis, said eccentricity E of said slide ring 13 is substantially increased for a time interval which definitely includes the shifting time interval of said gear transmission mechanism 4 and extends somewhat before and after said shifting time interval as an allowance for safety, thus guaranteeing higher pump output for engaging those ones of the friction engaging devices of the gear transmission mechanism 4 which are required to be engaged fromtheir disengaged conditions during this speed stage shift.

Thereby, the fluid torque converter 2 and the gear transmission mechanism 4 are properly and adequately supplied with hydraulic fluid pressure at substantially all times, according to their current operational circumstances. Thus, it is seen that, according to such a structure and such a method according to the present invention, satisfactory control of the hydraulic fluid pump can be exerted, and it is ensured that the transmission is never short of hydraulic fluid pressure during vehicle high engine load operation. Since high pump pressure is only provided when required, accordingly vehicle operational efficiency is maintained and engine output power is not wasted. Thereby, good fuel economy is maintained. Further, this control system and method ensure that the elements of the transmission are definitely well supplied with good lubrication at all times.

Figure 8:
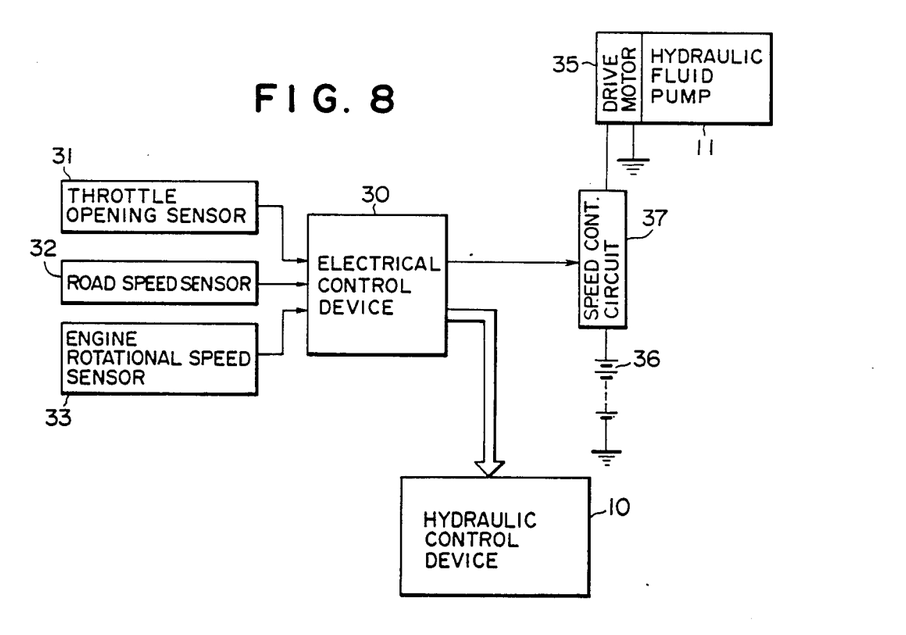
FIG. 8 is a combination drawing similar to FIG. 2 for the first preferred embodiment, being a schematic block diagram including, as blocks, relevant parts of the second preferred embodiment of the automatic transmission of the present invention, said second preferred embodiment including an electically powered hydraulic fluid pump of the fixed output type.

In FIG. 8, in a fashion similar to FIG. 2, there are shown in purely block diagrammatical form relevant parts of the second preferred embodiment of the control system of the present invention, and also there is shown by the blocks 35 and 11 an electrical type of hydraulic fluid pump which is controlled by said second preferred embodiment; in more detail, the block 11 represents the hydraulic fluid pump itself, and the block 35 represents an electric motor which drives it. This pump 11 and motor 35 are of per se known types - the pump 11, itself, is of a type which has a fixed pumping capacity, in other words whose pumping performance is determined according to the rotational speed of its input member and the electric motor 35 driving said pump 11, which is powered by the battery 36 of the vehicle, can be controlled with regard to its rotational speed by the electrical control device 30 for the transmission, via a speed control circuit 37 which is also per se known and which regulates the current through said electric motor 35. The other portions of the transmission control device shown in FIG. 2 are similar to those desribed above with regard to the first preferred embodiment of the present invention. Corresponding to this new structure, in FIG. 9, in a fashion similar to FIG. 4, there is presented a flow chart showing the relevant parts of another possible program for the microcomputer incorporated in the electrical control device 30, in this second preferred embodiment of the system of the present invention, for practicing the second preferred embodiment of the method of the present invention. This program fragment, which in some ways resembles the FIG. 4 program fragment but in some ways differs therefrom, will now be described; again, it performed at regular intervals, or once every time the crankshaft of the engine rotates through a determinate angle. First, in the step 1, the data from the sensors such as the sensors 31, 32, 33, and 34 is read in. Then the flow of control passes to the step 2.

Figure 10:
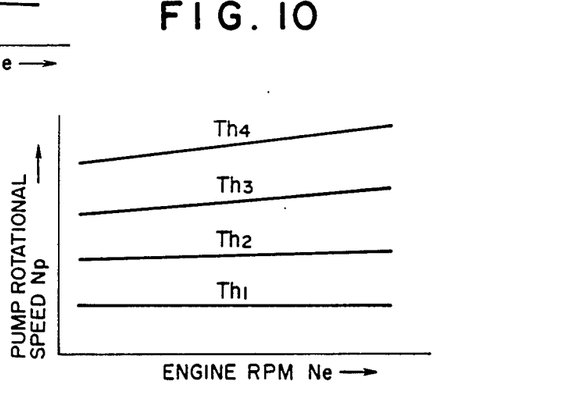
FIG. 10 is a graph relating to the operation of said second preferred embodiment, similar to FIG. 5 for the first preferred embodiment, inwhich engine crankshaft rotational speed Ne is shown along the horizontal axis and the rotational speed of the input member of said electrically powered hydraulic fluid pump is shown along the vertical axis, showing the pump rotational speed operational characteristics for different values of engine load as represented by throttle opening Th.

Next, in this step 2, a desired revolution speed Npn for the input member of the pump 11 is decided upon, based upon the current values of engine rotational speed Ne as just inputted from the engine rotational speed sensor 33 and of engine load as determined by the current value of engine throttle opening as just inputted from the throttle opening sensor 31. This desired pump rotational speed Npn increases as the engine rotational speed Ne increases, as shown in FIG. 10 which is a graph relating to the operation of said second preferred embodiment, similar to FIG. 5 for the first preferred embodiment, in which engine crankshaft rotational speed Ne is shown along the horizontal axis and the rotational speed of the input member of said electrically powered hydraulic fluid pump is shown along the vertical axis. Further, the desired pump rotational speed Npn increases as the engine throttle opening Th increases, for a given engine rotational speed; and, as said engine throttle opening Th (or engine load) increases, the rate of increase of the desired pump rotational speed Npn with increase of engine rotational speed Ne also increases, in other words the slope of the constant throttle opening lines shown in FIG. 10 increases with increasing engine load. Again, the desired pump rotational speed Npn may be determined from a data map stored in a read only memory (ROM) of the microcomputer and determined in advance according to the results of experiments on a test engine and transmission, or may be calculated on the spot; in any case, the characteristics of En with respect to the engine rotational speed Ne and the throttle opening Th are as specified above. In any case, next the flow of control passes to the decision step 3.

Figure 9:
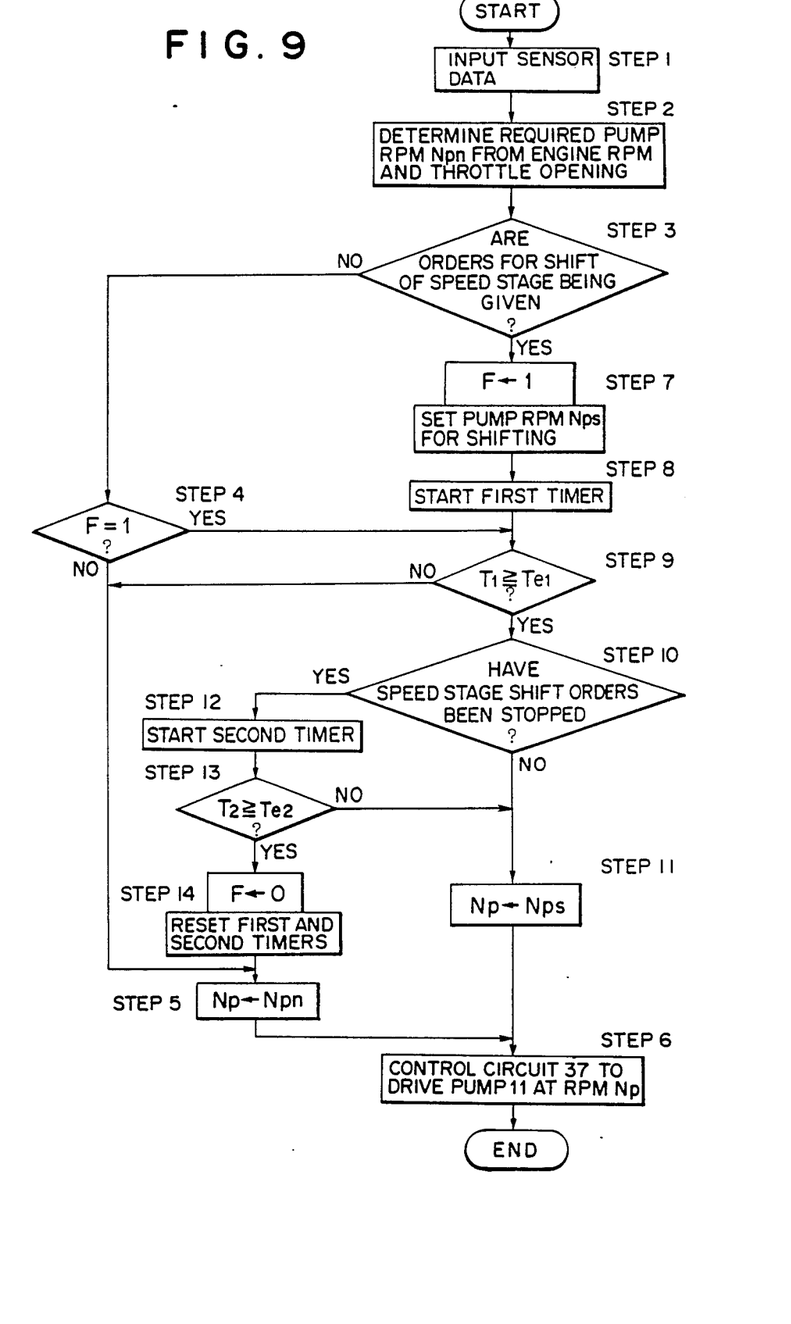
FIG. 9 is a flow chart similar to FIG. 4 for the first preferred embodiment, for a portion of a program executed by a microprocessor incorporated in said second preferred embodiment of the automatic transmission of the present invention for controlling the output pressure of said electrically powered type hydraulic fluid pump of FIG. 7, according to the second preferred embodiment of the method of the present invention.

Next, in this decision step 3, a decision is made as to whether or not, at this time, the electrical control device 30 is outputting a signal to the various solenoid valves etc. (not shown) of the hydraulic control device 10, to cause shifting of the speed stage of the gear transmission mechanism 4. If the answer to this decision is YES, then next the flow of control passes to the step 7; but otherwise, if the answer to this decision is NO, the flow of control passes to the decision step 4. Again, it should be noted that the speed stage of the gear transmission mechanism 4 only actually is started to be shifted after a lapse of a certain time period from the start of outputting of orders from the electrical control device 30 to the hydraulic control device 10 for such a speed stage shift.

In the decision step 4, at which point in the FIG. 4 program point it has been determined that orders are not currently being given by the electrical control device 30 for the engaged speed stage of the gear transmission mechanism 4 to be shifted, a test is made of the value of a flag F. If the value of the flag F is 1, then next the flow of control passes next to the decision step 9; while, if the value of the flag F is not 1, then next the flow of control passes to the step 5. This flag F is set to unity, as will be seen shortly, if and only if the speed stage of the gear transmission mechanism 7 is actually being shifted.

In the step 5, Npn is set to be the target value Np for the pump rotational speed; and next the flow of control passes to the step 6.

In this step 6, an electrical signal is outputted to the speed control circuit 37, so as to produce an appropriate current through the drive motor 35 to produce this value Np for the rotational speed of the input member of the pump 11. Then the flow of control passes to exit from the FIG. 9 routine, without doing anything further.

Now, reverting to the YES branch from the decision step 3, to which as specified earlier the flow of control is passed when it is decided that shifting orders are in fact currently being outputted by the electrical control device 30 to the various solenoid valves etc. (not shown) of the hydraulic control device 10 to cause shifting of the speed stage of the gear transmission mechanism 4, this branch leads to the step 7. In this step 7, the value of the flag F is set equal to 1, so as to cause a branching in the decision step 4 on the next iteration through the FIG. 9 routine in the appropriate direction, and next the value Nps for the rotational speed of the input member of the pump 11 is set to an appropriate value. This value Nps is substantially greater than the normal value Npn set in the step 2 for the speed of said pump 11, so as to cause the pump 11 to produce a significantly increased output at this time of speed stage shifting, for performing the actual work of engagement of those of the hydraulic fluid pressure friction actuated engaging means of the gear transmission mechanism 4 which are to be engaged during this speed stage shift; in fact, the value Nps may be determined according to which particular pair of speed stages of the gear transmission mechanism 4 are being shifted between, in other words may be varied according to which shift said gear transmission mechanism 4 is undergoing. Alternatively, the value Nps may be a single value which is utilized in the case of all speed stage shifting conditions. In any case, next the flow of control passes to the step 8.

In this step 8, a first timer is started. Then the flow of control passes to the decision step 9.

Next, in this decision step 9, to whcih also the flow of control passes from the YES branch from the decision step 4 as stated above, a decision is made as to whether or not the time interval t1 so far counted by this first timer has yet become greater than or equal to a predetermined time interval Te1, ornot. This time interval Te1 could be the same as that one utilized in the first preferred method embodiment illustrated in FIG. 4. If the answer to this decision is YES, then next the flow of control passes to the decision step 10; and otherwise, if the answer to this decision is NO, the flow of control passes to the step 5, already described.

In the decision step 10, a decision is made as to whether the electrical control device 30 has yet ceased to output its signal or signals to the various solenoid valves etc. (not shown) of the hydraulic control device 10, to cause shifting of the speed stage of the gear transmission mechanism 4, or not. If the answer to this decision is YES, then next the flow of control passes to the step 12; and otherwise, if the answer to this decision is NO, the flow of control passes to the step 11.

In the step 11, to which control passes if it has been determined that orders for speed stage shifting have not yet been stopped, the target value Np for the rotational speed of the pump 11 is set to the value Nps. Then the flow of control passes to the step 6, already described.

On the other hand, in the step 12, to which control passes if it has been determined that orders for speed stage shifting have now been stopped, a second timer is started, and next the flow of control passes to the decision step 13.

In this decision step 13, a decision is made as to whether or not the time interval t2 so far counted by this second timer has yet become greater than or equal to a predetermined time nterval Te2, ornot. If the answer to this decision is YES, then next the flow of control passes to the step 14; and otherwise, if the answer to this decision is NO, the flow of control passes to the step 11, already described.

In this step 14, the value of the flag F is reset to zero, and also the first and second timers are reset. Then the flow of control passes to the step 5, already described.

Thus it is seen that, according to these second preferred embodiments of the method and the device of the present invention, the same beneficial effects are obtained as in the case of the first preferred embodiment, but this time using an electrically driven fixed output type pump.

Although the present invention has been described in terms of the preferred embodiments thereof detailed above, and with reference to the illustrative drawings, it should not be considered as limited thereby, since various alterations, omissions, and/or modifications to the details of the shown preferred embodiments could be made without departing from the scope of the present invention. For example, although throttle opening has been taken as a parameter representative of engine load in the shown preferred embodiments, in other embodiments some other parameter, such as accelerator pedal depression, engine output shaft torque, or fuel supply rate, could be used to represent engine load. Various other possibilities could be considered. Further, the details of the appended drawings are only to be taken as being exemplary, and not as being limiting, since in other possible embodiments these details could be departed from without straying from the scope of the present invention. Accordingly the scope of the present invention, and of the protection sought to be granted by Letters Patent, should be considered as defined, not by the perhaps purely fortuitous details of the shown preferred embodiments, or of the drawings, but solely by the legitimate and proper scope of the Claims, which follow.

What is claimed is:

1. A control method for a hydraulic fluid pump comprised in a hydraulically actuated automatic transmission system for a vehicle driven by an engine, said transmission system having hydraulic means for establishing a speed ratio thereof, said hydraulic means using hydraulic fluid at a line pressure maintained by said hydraulic fluid pump, said method comprising the steps of:
    detecting the load on said engine; and:
    controlling said hydraulic fluid pump such that an output thereof increases with an increase of said detected value of the load on said engine.

2. A control method according to claim 1, said hydraulic fluid pump being one whose output per one revolution of its input member is variable, wherein said output of said hydraulic fluid pump is thus controlled by increasing said output of said pump per one revolution of its input member along with increase in engine load.

3. A control method according to claim 2, said hydraulic fluid pump being a variable capacity type vane type hydraulic fluid pump the output of which per one revolution of its input member is controlled by varying the eccentric position of a controlling member thereof, wherein said output of said hydraulic fluid pump per one revolution of its input member is thus controlled by detecting said eccentric position of said controlling member thereof using a sensor, and by varying said eccentric position of said controlling member in a feedback manner to achieve a target eccentric position thereof which is determined to give an output of said pump per one revolution of its input member varying as an increasing function of engine load.

4. A control method according to claim 1, said hydraulic fluid pump being a fixed capacity type electrically driven type hydraulic fluid pump the output of which per one revolution of its input member is substantially constant, wherein said output of said hydraulic fluid pump is thus controlled by varying the rotation speed of its said input member as an increasing function of engine load.

5. A control method for a hydraulic fluid pump comprised in a hydraulically actuated automatic transmission system for a vehicle driven by an engine, said transmission system having hydraulic means for establishing a speed ratio thereof, said hydraulic means using hydraulic fluid at a line pressure maintained by said hydraulic fluid pump, said method comprising the steps of:

detecting the load on said engine; and:
controlling said hydraulic fluid pump such that an output thereof increases with an increase of said detected value of the load on said engine and increases with an increase of said detected value of the rotational speed of said engine.

6. A control method according to claim 5, said hydraulic fluid pump being one whose output per one revolution of its input member is variable, wherein said output of said hydraulic fluid pump is thus controlled by increasing said output of said pump per one revolution of its input member along with increase in engine load and along with increase in engine rotational speed.

7. A control method according to claim 6, said hydraulic fluid pump being a variable capacity type vane type hydraulic fluid pump the output of which per one revolution of its input member is controlled by varying the eccentric position of a controlling member thereof, wherein said output of said hydraulic fluid pump per one revolution of its input member is thus controlled by detecting said eccentric position of said controlling member thereof using a sensor, and by varying said eccentric position of said controlling member in a feedback manner to achieve a target eccentric position thereof which is determined to give an output of said pump per one revolution of its input member varying as an increasing function of engine load and as an increasing function of engine speed.

8. A control method according to claim 5, said hydraulic fluid pump being a fixed capacity type electrically driven type hydraulic fluid pump the output of which per one revolution of its input member is substantially constant, wherein said output of said hydraulic fluid pump is thus controlled by varying the rotation speed of its saidinput member as an increasing function of engine load and as an increasing function of engine speed.

9. A control method for a hydraulic fluid pump comprised in and supplying pressurized hydraulic fluid for a hydraulically actuated automatic transmission system for a vehicle driven by an engine, said transmission system having hydraulic means for establishing a speed stage thereof, said hydraulic means using hydraulic fluid at a line pressure maintained by said hydraulic fluid pump, said method comprising the steps of:
detecting the load on said engine;
determining whether said transmission is currently changing from one speed stage thereof to another; and
controlling said hydraulic fluid pump such that an output thereof increases with an increase of said detected value of the load on said engine and also to increase when said transmission is changing from one speed stage thereof to another.

10. A control method according to claim 9, said hydraulic fluid pump being one whose output per one revolution of its input member is variable, wherein said output of said hydraulic fluid pump is thus controlled by increasing said output of said pump per one revolution of its input member along with increase in engine load and also when said transmission is currently changing from one speed stage thereof to another.

11. A control method according to claim 10, said hydraulic fluid pump being a variable capacity type vane type hydraulic fluid pump the output of which per one revolution of its input member is controlled by varying the eccentric position of a controlling member thereof, wherein said output of said hydraulic fluid pump per one revolution of its input member is thus controlled by detecting said eccentric position of said controlling member thereof using a sensor, and by varying said eccentric position of said controlling member in a feedback manner to achieve a target eccentric position thereof which is determined to give an output of said pump per one revolution of its input member varying as an increasing function of engine load and as increased when said transmission is currently changing from one speed stage thereof to another.

12. A control method according to claim 9, said hydraulic fluid pump being a fixed capacity type electrically driven type hydraulic fluid pump the output of which per one revolution of its input member is substantially constant, wherein said output of said hydraulic fluid pump is thus controlled by varying the rotation speed of its said input member as an increasing function of engine load and as increased when said transmission is currently changing from one speed stage thereof to another.

13. In a hydraulically actuated automatic transmission system for a vehicle driven by an engine, said transmission system having hydraulic means for establishing a speed ratio thereof and hydraulic fluid pump means for supplying pressurized hydraulic fluid to said means for establishing at a line pressure, a control system comprising:
means for detecting the load on said engine; and
means for controlling said hydraulic fluid pump such that an output thereof increases with an increase of said detected value of the load on said engine.

14. A system according to claim 13, said hydraulic fluid pump being one whose per one revolution of its input member is variable, wherein said means for controlling the output of said hydraulic fluid pump does so by increasing said output of said pump per one revolution of its input member along with increase in engine load.

15. A system according to claim 14, said hydraulic fluid pump being a variable capacity type vane type hydraulic fluid pump the output of which per one revolution of its input member is controlled by varying the eccentric position of a controlling member thereof, wherein said means for controlling the output of said hydraulic fluid pump per one revolution of its input member does so by detecting said eccentric position of said controlling member thereof using a sensor, and by varying said eccentric position of said controlling member in a feedback manner to achieve a target eccentric position thereof which is determined to give an output of said pump per one revolution of its input member varying as an increasing function of engine load.

16. A system according to claim 13, said hydraulic fluid pump being a fixed capacity type electrically driven type hydraulic fluid pump the output of which per one revolution of its input member is substantially constant, wherein said means for controlling the output of said hydraulic fluid pump does so by varying the rotation speed of its said input member as an increasing function of engine load.

17. In a hydraulically actuated automatic transmission system for a vehicle driven by an engine, said transmission system having hydraulic means for establishing a speed ratio thereof and hydraulic fluid pump means for supplying pressurized hydraulic fluid to said means for establishing at a line pressure, a control system comprising:
means for detecting the load on said engine; and means for controlling said hydraulic fluid pump such that an output thereof increases with an increase of said detected value of the load on said engine and increases with an increase of said detected value of the rotational speed of said engine.

18. A system according to claim 17, said hydraulic fluid pump being one whose output per one revolution of its input member is variable, wherein said means for controlling the output of said hydraulic fluid pump does so by increasing said output of said pump per one revolution of its input member along with increase in engine load and along with increase in engine rotational speed.

19. A system according to claim 18, said hydraulic fluid pump being a variable capacity type vane type hydraulic fluid pump the output of which per one revolution of its input member is controlled by varying the eccentric position of a controlling member thereof, wherein said means for controlling the output of said hydraulic fluid pump per one revolution of its input member does so by detecting said eccentric position of said controlling member thereof using a sensor, and by varying said eccentric position of said controlling member in a feedback manner to achieve a target eccentric position thereof which is determined to give an output of said pump per one revolution of its input member varying as an increasing function of engine load and as an increasing function of engine speed.

20. A system according to claim 17, said hydraulic fluid pump being a fixed capacity type electrically driven type hydraulic fluid pump the output of which per one revolution of its input member is substantially constant, wherein said means for controlling the output of said hydraulic fluid pump does so by varying the rotation speed of its said input member as an increasing function of engine load and as an increasing function of engine speed.

21. In a hydraulically actuated automatic transmission system for a vehicle driven by an engine, said transmission system having hydraulic means for establishing a speed stage thereof and hydraulic fluid pump means for supplying pressurized hydraulic fluid to said means for establishing at a line pressure, a control system comprising:

means for detecting the load on said engine;
means for determining whether said transmission is currently changing from one speed stage thereof to another; and
means for controlling said hydraulic fluid pump such that an output thereof increases with an increase of said detected value of the load on said engine and also increases when said transmission is changing from one speed stage thereof to another.

22. A system according to claim 21, said hydraulic fluid pump being one whose output per one revolution of its input member is variable, wherein said means for controlling the output of said hydraulic fluid pump does so by increasing said output of said pump per one revolution of its input member along with increase in engine load and also when said transmission is currently changing from one speed stage thereof to another.

23. A system according to claim 22, said hydraulic fluid pump being a variable capacity type vane type hydraulic fluid pump the output of which per one revolution of its input member is controlled by varying the eccentric position of a controlling member thereof,- wherein said means for controlling the output of said hydraulic fluid pump per one revolution of its input member does so by detecting said eccentric position of said controlling member thereof using a sensor, and by varying said eccentric position of said controlling member in a feedback manner to achieve a target eccentric position thereof which is determined to give an output of said pump per one revolution of its input member varying as an increasing function of engine load and as increased when said transmission is currently changing from one speed stage thereof to another.

24. A system according to claim 21, said hydraulic fluid pump being a fixed capacity type electrically driven type hydraulic fluid pump the output of which per one revolution of its input member is substantially constant, wherein said means for controlling output of said hydraulic fluid pump does so by varying the rotation speed of its said input member as an increasing function of engine load and as increased when said transmission is currently changing from one speed stage thereof to another.

* * * * *